US011436991B2

(12) United States Patent
Shin et al.

(10) Patent No.: US 11,436,991 B2
(45) Date of Patent: Sep. 6, 2022

(54) DISPLAY DEVICE INCLUDING AN EMBEDDED GATE DRIVING CIRCUIT

(71) Applicant: Samsung Display Co., Ltd., Yongin-Si (KR)

(72) Inventors: Dong Hee Shin, Asan-si (KR); Geunho Lee, Hwaseong-si (KR); Yonghee Lee, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/326,399

(22) Filed: May 21, 2021

(65) Prior Publication Data
US 2022/0013076 A1 Jan. 13, 2022

(30) Foreign Application Priority Data
Jul. 10, 2020 (KR) ........................ 10-2020-0085289

(51) Int. Cl.
*G09G 3/30* (2006.01)
*G09G 3/36* (2006.01)
*G02F 1/133* (2006.01)

(52) U.S. Cl.
CPC ....... *G09G 3/3677* (2013.01); *G02F 1/13306* (2013.01); *G09G 2300/0426* (2013.01); *G09G 2310/08* (2013.01)

(58) Field of Classification Search
CPC ............ G09G 3/3677; G09G 2310/08; G09G 3/29–2948; G09G 2300/0838–0895; G09G 3/3611–3696; G09G 2310/00–0297; G02F 1/13306
See application file for complete search history.

(56) References Cited

U.S. PATENT DOCUMENTS

| 10,096,374 | B2 | 10/2018 | Shang et al. | |
|---|---|---|---|---|
| 2011/0304786 | A1* | 12/2011 | Mok | G02F 1/1345 349/33 |
| 2012/0098800 | A1* | 4/2012 | Kim | G11C 19/28 345/204 |
| 2017/0309242 | A1* | 10/2017 | Kim | H01L 29/78675 |
| 2018/0190233 | A1* | 7/2018 | Jang | G09G 3/3677 |

FOREIGN PATENT DOCUMENTS

CN 110058469 A 7/2019
KR 10-2016-0044177 A 4/2016

* cited by examiner

*Primary Examiner* — Sanghyuk Park
(74) *Attorney, Agent, or Firm* — Innovation Counsel LLP

(57) ABSTRACT

Provided is a display device including a display panel and a gate driving circuit. The gate driving circuit includes a stage part including a first stage group and a second stage group cascade-connected to the first stage group, a branch line part having first branch lines electrically connected to the first stages, respectively, and second branch lines electrically connected to the second stages, respectively, line pattern rows having first pattern rows electrically connected to the first branch lines and second pattern rows electrically connected to the second branch lines, respectively, and a signal line facing the line pattern rows in the first direction. Any one second branch line among the second branch lines includes a first line portion extending in the first direction and a second line portion extending in the second direction and disposed between the signal line and the line pattern rows on a plane.

20 Claims, 7 Drawing Sheets

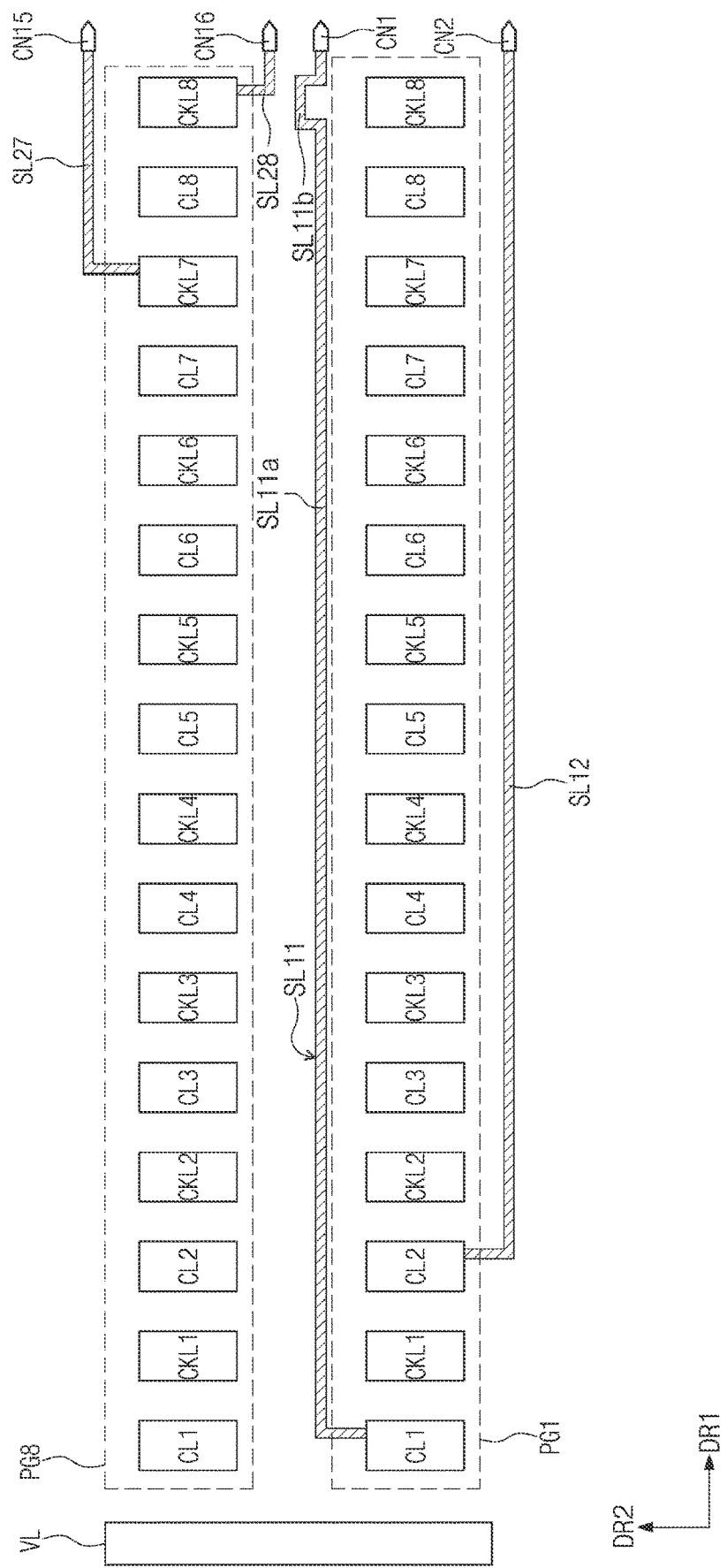

DISPLAY DEVICE INCLUDING AN EMBEDDED GATE DRIVING CIRCUIT

CROSS-REFERENCE TO RELATED APPLICATIONS

This U.S. non-provisional patent application claims priority under 35 U.S.C. § 119 to Korean Patent Application No. 10-2020-0085289, filed on Jul. 10, 2020, the entire contents of which are hereby incorporated by reference.

BACKGROUND

The present disclosure herein relates to a display device, and more particularly, to a display device including a gate driving circuit.

A display device includes a display panel having a plurality of gate lines, a plurality of data lines, a plurality of pixels connected to the gate lines and the data lines, a gate driving circuit providing gate signals to the gate lines, and a data driving circuit providing data signals to the data lines.

Particularly, the gate driving circuit includes a plurality of stages configured to output the gate signals, and the stages have a shape embedded in the display panel.

SUMMARY

The present disclosure provides a display device capable of improving driving reliability.

An embodiment of the inventive concept provides a display device including a display panel and a gate driving circuit configured to output a plurality of gate signals to the display panel, wherein the gate driving circuit includes a stage part including a first stage group which has a plurality of first stages and a second stage group which has a plurality of second stages and cascade-connected to the first stage group, a branch line part including first branch lines electrically connected to the plurality of first stages, respectively, and second branch lines electrically connected to the second stages, respectively, the first branch lines and the second branch lines extending in a first direction and arranged in a second direction crossing the first direction, line pattern rows having first pattern rows electrically connected to the first branch lines and second pattern rows electrically connected to the second branch lines, respectively, and a signal line facing the line pattern rows in the first direction, wherein any one second branch line among the second branch lines includes a first line portion extending in the first direction and a second line portion extending in the second direction and disposed between the signal line and the line pattern rows in a plan view.

In an embodiment, each of the line pattern rows may include a plurality of first clock line patterns and a plurality of second clock line patterns alternately arranged along the first direction.

In an embodiment, each of the first pattern rows may be electrically connected to two corresponding first branch lines among the first branch lines, and each of the second pattern rows may be electrically connected to two corresponding second branch lines among the second branch lines.

In an embodiment, the two first branch lines may be respectively connected to two corresponding first clock line patterns among the plurality of first clock line patterns receives a clock signal, and a second clock line pattern among the plurality of second clock line patterns receives a clock bar signal having an inverted phase with respect to the clock signal.

In an embodiment, a first clock line pattern among the plurality of first clock line patterns receives a clock signal, and a second clock line pattern among the plurality of second clock line patterns may receive a clock bar signal having an inverted phase with respect to the clock signal.

In an embodiment, the one second branch line may be connected to a second clock line pattern disposed most adjacent to the signal line among the plurality of second clock line patterns.

In an embodiment, any one first clock line pattern among the plurality of first clock line patterns may be disposed between the second clock line pattern and the second line portion.

In an embodiment, the first clock line pattern may directly face the signal line in the first direction and receive a clock signal, and the second clock line pattern may receive a clock bar signal having an inverted phase with respect to the clock signal.

In an embodiment, the second line portion may overlap between the second pattern rows and the signal line.

In an embodiment, the second branch line and the signal line may be disposed on different layers.

In an embodiment, each of the remaining second branch lines among the second branch lines may not overlap between the signal line and the line pattern rows in a plan view.

In an embodiment, a first branch line connected to any one first pattern row among the first branch lines may include a parallel line portion extended in the first direction and a protruding line portion having a shape bent from the parallel line portion.

In an embodiment, each of the line pattern rows may include a plurality of first clock line patterns and a plurality of second clock line patterns spaced apart from each other and alternately arranged along the first direction.

In an embodiment, the first pattern row may face any one second pattern row among the second pattern rows in the second direction, and the protruding line portion may face any one second clock line pattern among the plurality of second clock line patterns included in the second pattern row in the second direction.

In an embodiment, the protruding line portion may be more adjacent to the second clock line pattern than the parallel line portion in the second direction.

In an embodiment, the second clock line pattern may be disposed at the outermost periphery among the plurality of second clock line patterns and may be disposed farthest from the signal line.

In an embodiment of the inventive concept, a display device includes a display panel and a gate driving circuit configured to output a plurality of gate signals to the display panel. The gate driving circuit includes a stage part including a first stage group which has a plurality of first stages and a second stage group which has a plurality of second stages and cascade-connected to the first stage group, a branch line part including first branch lines extended in a first direction, arranged in a second direction crossing the first direction, and electrically connected to the plurality of first stages, respectively, and second branch lines electrically connected to the second stages, respectively, and line pattern rows including first pattern rows electrically connected to the first branch lines and second pattern rows electrically connected to the second branch lines, respectively, wherein a first branch line connected to any one first pattern row among the first branch lines includes a parallel line portion extended in the first direction and a protruding line portion having a shape bent from the parallel line portion.

In an embodiment, the display device may further include a common line facing the line pattern rows in the first direction and receives a common signal, wherein a second branch line among the second branch lines includes a first line portion extended in the first direction and a second line portion extended in the second direction and disposed between the common line and the line pattern rows in a plan view.

In an embodiment, the one first pattern row may face any one second pattern row among the second pattern rows in the second direction, and the protruding line portion may be more adjacent to the second pattern row than the parallel line portion in the second direction.

In an embodiment, each of the line pattern rows may include a plurality of first clock line patterns and a plurality of second clock line patterns spaced apart from each other and alternately arranged along the first direction, any one second clock line pattern among the plurality of second clock line patterns included in the second line pattern row faces the protruding line portion, and the one second clock line pattern is disposed at the outermost periphery among the plurality of second clock line patterns.

BRIEF DESCRIPTION OF THE FIGURES

The accompanying drawings are included to provide a further understanding of the inventive concept and are incorporated in and constitute a part of this specification. The drawings illustrate example embodiments of the inventive concept and, together with the description, serve to explain principles of the inventive concept. In the drawings:

FIG. 7 is a diagram showing a line part which provides a gate control signal to the stages illustrated in FIG. 3 according to another embodiment of the inventive concept.

DETAILED DESCRIPTION

Figure 1:
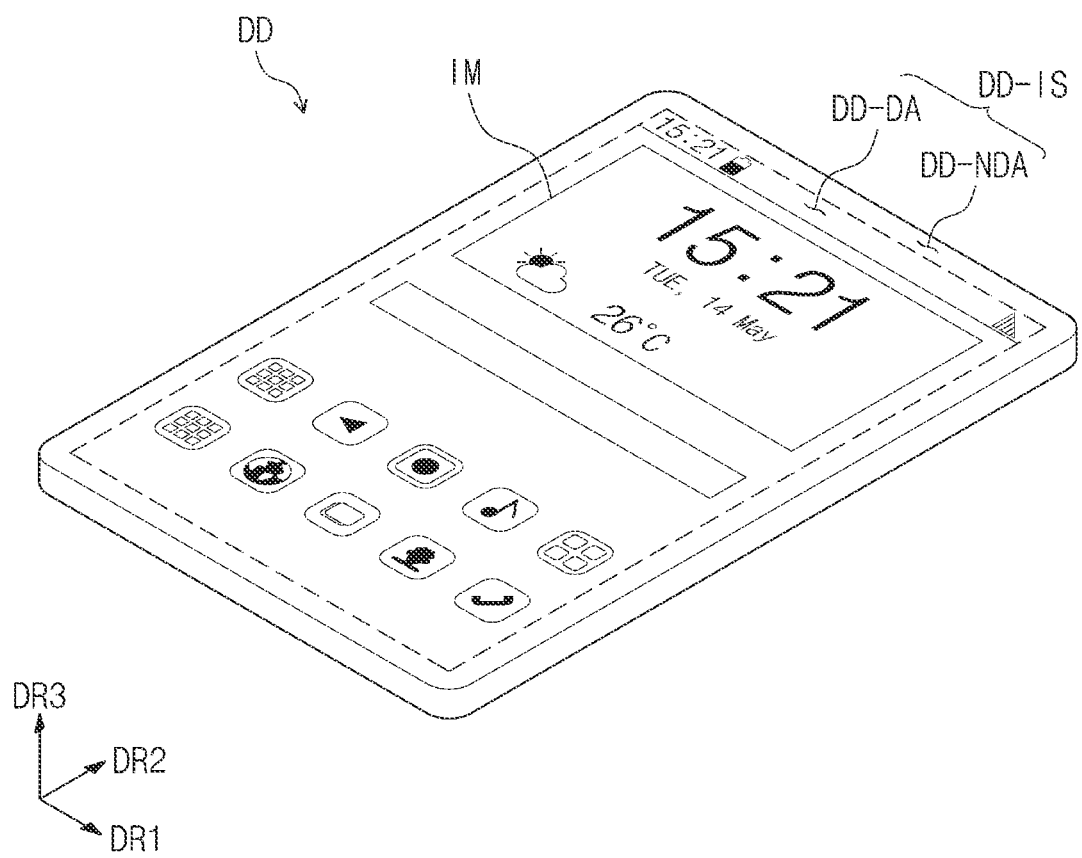
FIG. 1 is a perspective view of a display device according to an embodiment of the inventive concept.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

Unless otherwise defined, all terms (including technical and scientific terms) used herein have the same meaning as commonly understood by those skilled in the art to which the inventive concept pertains. It is also to be understood that terms defined in commonly used dictionaries should be interpreted as having meanings consistent with the meanings in the context of the related art and are expressly defined herein unless they are interpreted in an ideal or overly formal sense.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, example embodiments of the inventive concept will be described with reference to the accompanying drawings.

Figure 2A:
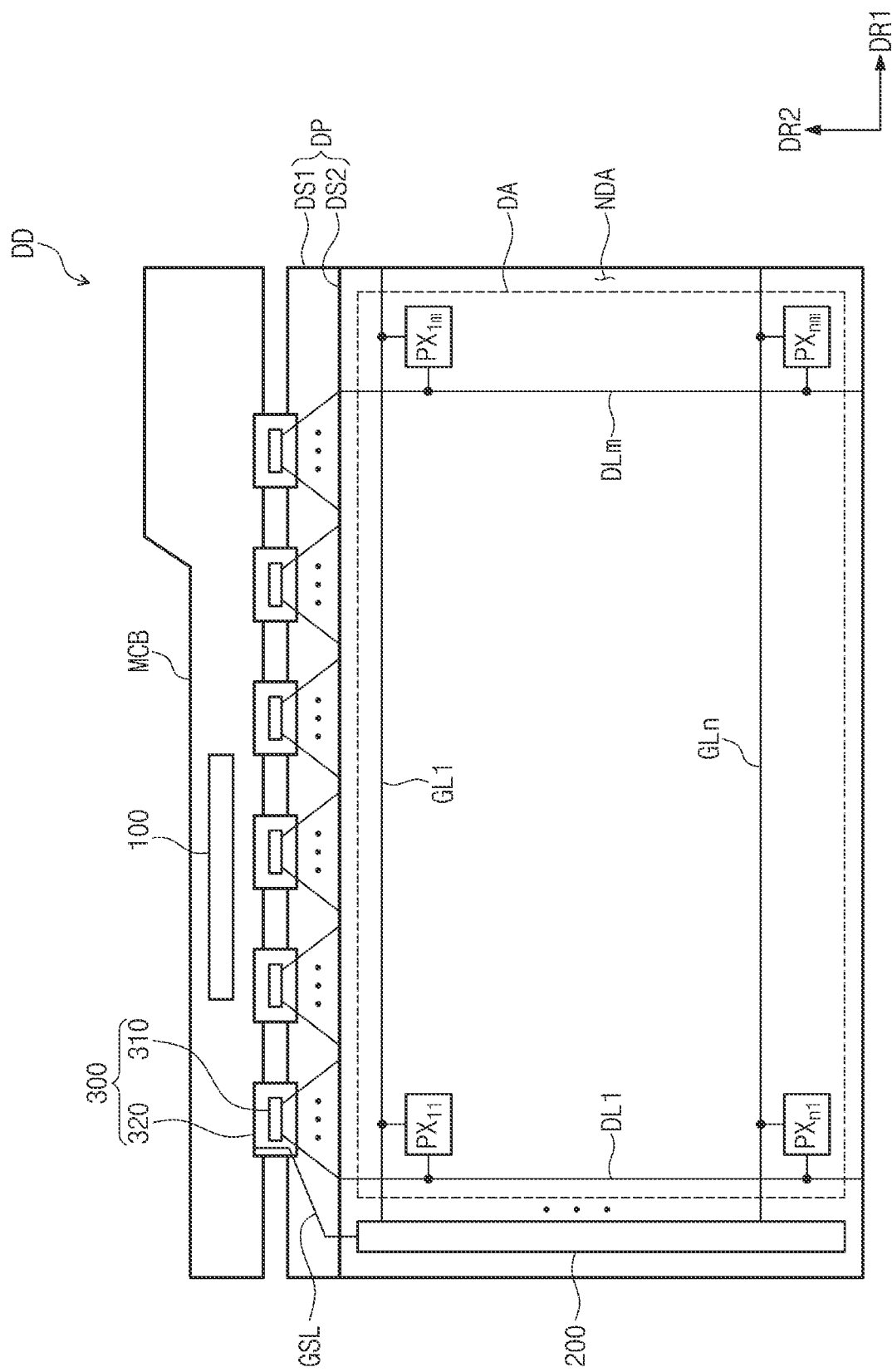
FIG. 2A is a plan view of a display device according to an embodiment of the inventive concept.
Figure 2B:
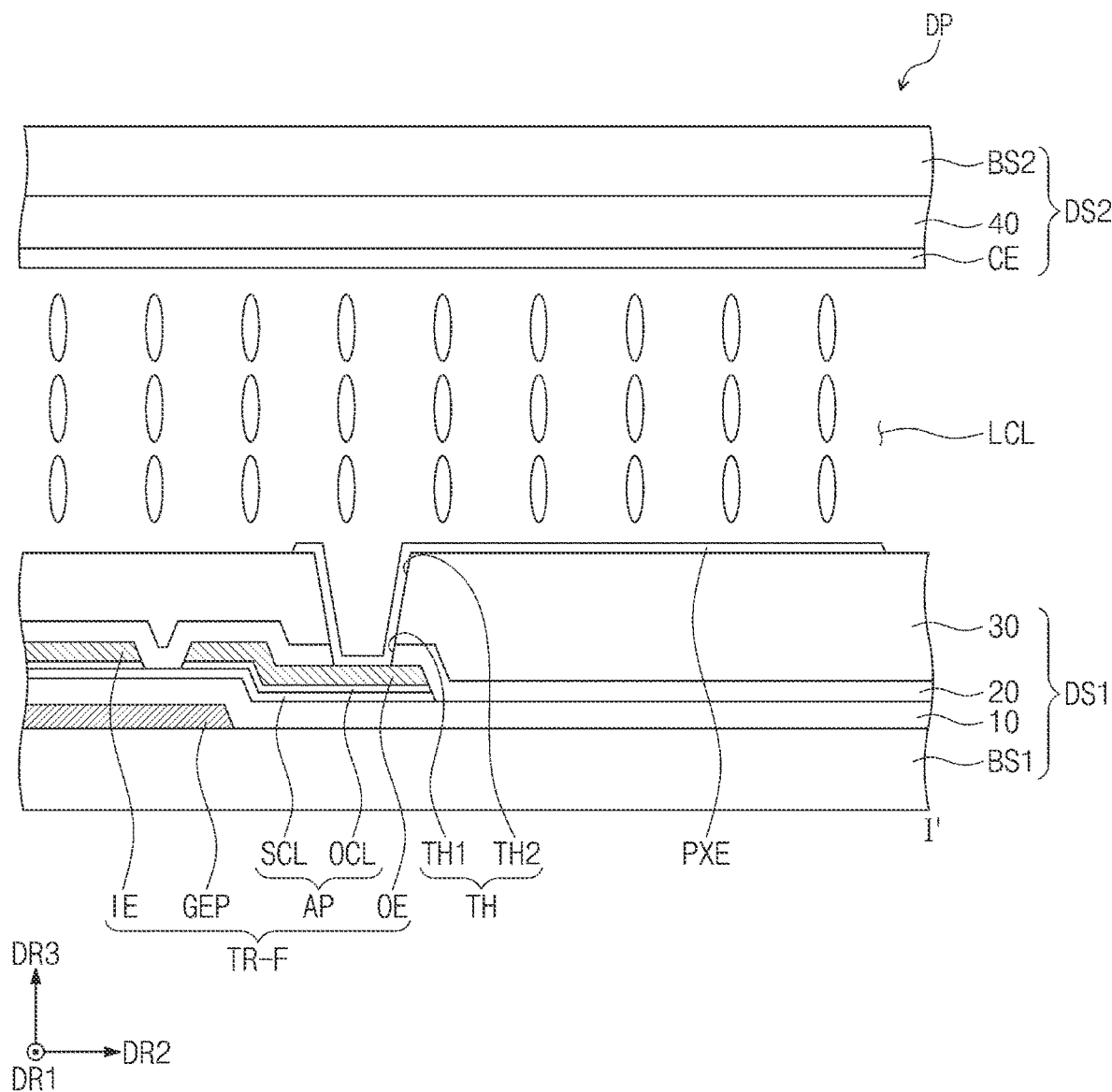
FIG. 2B is a cross-sectional view of a display device according to an embodiment of the inventive concept.

FIG. 1 is a perspective view of a display device according to an embodiment of the inventive concept. FIG. 2A is a plan view of a display device according to an embodiment of the inventive concept. FIG. 2B is a cross-sectional view of a display device according to an embodiment of the inventive concept.

Referring to FIG. 1, in the present disclosure, a display device DD applicable to a cellphone terminal is illustrated. Although not illustrated, electronic modules, a camera module, a power module, and the like mounted on a main board may be disposed in a bracket/case and the like together with the display device DD to configure the cellphone terminal. The display device DD according to the inventive concept may be applied to large electronic devices such as a television and a monitor, and small and medium-sized electronic devices such as a tablet, a car navigation system, a game machine, and a smart phone.

Referring to FIG. 1, the display device DD may display an image IM through a display surface DD-IS. In FIG. 1, as an example of the image IM, icon images are illustrated. The display surface DD-IS is parallel to a plane defined by a first direction axis DR1 and a second direction axis DR2. The normal direction of the display surface DD-IS, that is, the thickness direction of the display device DD is indicated by a third direction DR3. In the present disclosure, "in a plan view," "when viewed on a plane," or "on a plane" may mean when viewed from the direction DR3. A front surface (or an upper surface) and a back surface (or a lower surface) of each layer or unit described below are distinguished by the third direction DR3. However, directions indicated by the first to third directions DR1, DR2, and DR3 are a relative concept, and may mean other directions, for example, opposite directions.

Also, the display surface DD-IS includes a display area DD-DA on which the image IM is displayed, and a non-display area DD-NDA adjacent to the display area DD-DA. The non-display area DD-NDA is an area on which the image IM is not displayed. However, the embodiment of the inventive concept is not limited thereto. The non-display area DD-NDA may be adjacent to only one side of the display area DD-DA or may be omitted.

Referring to FIG. 2A, the display device DD includes a display panel DP, a signal control circuit 100, a gate driving circuit 200, a data driving circuit 300, and a driving circuit board MCB.

The display panel DP includes a first display substrate DS1 and a second display substrate DS2 facing each other in the third direction DR3. Also, the display panel DP includes a display area DA for displaying an image and a non-display area NDA adjacent to the display area DA. The display area DA and the non-display area NDA of the display panel DP may correspond to the display area DD-DA and the non-display area DD-NDA of the display device DD illustrated in FIG. 1.

The display panel DP includes a plurality of gate lines GL1 to GLn, a plurality of data lines DL1 to DLm, and a plurality of pixels PX11 to PXnm. The gate lines GL1 to GLn extend in the first direction DR1 and are arranged in the second direction DR2. The data lines DL1 to DLm extend in the second direction DR2 and arranged in the first direction DR1. The data lines DL1 to DLm may cross the gate lines GL1 to GLn while being insulated therefrom. The gate lines GL1 to GLn are connected to the gate driving circuit 200, and the data lines DL1 to DLm are connected to the data driving circuit 300. The pixels PX11 to PXnm are connected to the gate lines GL1 to GLn and the data lines DL1 to DLm.

Although not illustrated, the plurality of gate lines GL1 to GLn, the plurality of data lines DL1 to DLm, and the plurality of pixels PX11 to PXnm may be disposed on the first display substrate DS1.

The signal control circuit 100 may be mounted on the driving circuit board MCB. The signal control circuit 100 receives image data and a control signal from an external graphics controller (not shown). The signal control circuit 100 outputs, in response to the control signal, a gate control signal to the gate driving circuit 200 and a data control signal to the data driving circuit 300.

For example, the control signal may include a vertical synchronization signal which is a signal for distinguishing frame periods, a horizontal synchronization signal which is a signal for distinguishing horizontal periods, for example, rows, a data enable signal having an active level only during a period in which data is output, clock signals, and the like.

The gate driving circuit 200 generates gate signals in response to the gate control signal received from the signal control circuit 100 through a signal line GSL. The gate control signal may include a vertical start signal for starting the operation of the gate driving circuit 200. The gate driving circuit 200 outputs gate signals to gate lines, respectively. The gate signals may be sequentially output to correspond to each horizontal period.

According to an embodiment of the inventive concept, the gate driving circuit 200 may be formed simultaneously with the pixels PX11 to PXnm in the display area DA through a thin film process. As an example, the gate driving circuit 200 may be formed on the first display substrate DS1 in the non-display area NDA in the form of an amorphous silicon TFT gate driver circuit (ASG). As another example, the gate driving circuit 200 may be formed on the first display substrate DS1 in the non-display area NDA in the form of an oxide semiconductor TFT gate driver circuit (OSG).

The data driving circuit 300 receives the data control signal and image signals from the signal control circuit 100. The data driving circuit 300 converts the image signals into a plurality of data voltages in response to the data control signal and provides the plurality of data voltages to the data lines DL1 to DLm. For example, the data control signal may include a horizontal start signal for starting the operation of the data driving circuit 300, an inversion signal for inverting the polarity of the data voltages, an output indication signal for determining when to output the data voltages from the data driving circuit 300, and the like.

The data driving circuit 300 may include a driving chip 310 and a flexible circuit board 320 on which the driving chip 310 is mounted. The flexible circuit board 320 electrically connects the driving circuit board MCB and the first display substrate DS1. The driving chip 310 provide corresponding data signals to corresponding data lines among the plurality of data lines DL1 to DLm.

Meanwhile, FIG. 2A illustrates the data driving circuit 300 of a tape carrier package (TCP) type, but the embodiment of the inventive concept is not limited thereto. As another example, the data driving circuit 300 may be mounted on the non-display area NDA of the first display substrate DS1 in a chip on glass (COG) manner.

Referring to FIG. 2B, a portion of the display panel DP in the display area DA is illustrated. Particularly, the display panel DP illustrated in FIG. 2B is described as a liquid crystal display panel including a liquid crystal layer LCL. However, the embodiment of the inventive concept is not limited thereto. The display panel DP may be a light-emitting type display panel. For example, the display panel DP may be an organic light emitting display panel or a quantum dot light emitting display panel. An emission layer of an organic light emitting display panel may include an organic light emitting material. An emission layer of a quantum dot light emitting display panel may include a quantum dot, a quantum load, and the like.

In detail, the first display substrate DS1 includes a first base layer BS1, a first insulation layer 10, an intermediate insulation layer 20, a second insulation layer 30, a pixel electrode PXE, and a thin film transistor TR-F. The thin film transistor TR-F includes a control electrode GEP, a first electrode IE, a second electrode OE, and a semiconductor pattern AP.

On an upper surface of the first base layer BS1, the control electrode GEP is disposed. The control electrode GEP may include a metal such as aluminum (Al), silver (Ag), copper (Cu), molybdenum (Mo), chrome (Cr), tantalum (Ta), and titanium (Ti), or an alloy thereof.

The first base layer BS1 may be a glass substrate or a plastic substrate. On an upper surface of the first base layer BS1, the first insulation layer 10 which covers the control electrode GEP is disposed. The first insulation layer 10 may include at least one of an inorganic material or an organic material. In the present embodiment, the first insulation layer 10 may be an inorganic layer. The first insulation layer 10 may include a silicon nitride layer, a silicon oxynitride layer, a silicon oxide layer, a titanium oxide layer, an aluminum oxide layer, or the like.

On the first insulation layer 10, the semiconductor pattern AP overlapping the control electrode GEP is disposed. The semiconductor pattern AP may include a semiconductor layer SCL and an ohmic contact layer OCL. On the first insulation layer 10, the semiconductor layer SCL is disposed, and on the semiconductor layer SCL, the ohmic contact layer OCL is disposed.

The semiconductor layer SCL may include amorphous silicon or polysilicon. In addition, the semiconductor layer SCL may include a metal oxide semiconductor. The ohmic contact layer OCL may include a highly doped semiconductor layer. The ohmic contact layer OCL may include two portions spaced apart from each other.

On the semiconductor pattern AP, the first electrode IE and the second electrode OE are disposed. On the first insulation layer 10, the intermediate insulation layer 20 which covers the first electrode IE and the second electrode OE is disposed. The intermediate insulation layer 20 may include at least one of an inorganic material or an organic material. In the present embodiment, the intermediate insulation layer 20 may be an inorganic layer. The intermediate insulation layer 20 may include a silicon nitride layer, a silicon oxynitride layer, a silicon oxide layer, a titanium oxide layer, an aluminum oxide layer, or the like.

On the second insulation layer 30, the pixel electrode PXE is disposed. The pixel electrode PXE is connected to the second electrode OE through a pixel contact hole TH passing through the intermediate insulation layer 20 and the second insulation layer 30. The pixel contact hole TH includes a first contact hole TH1 and a second contact hole TH2. The first contact hole TH1 is defined in the intermediate insulation layer 20 and exposes the second electrode OE. The second contact hole TH2 is defined in the second insulation layer 30 in an area corresponding to the first contact hole TH1.

The second display substrate DS2 includes a second base layer BS2, a black matrix BM, a third insulation layer 40, and a common electrode CE. The second base substrate BS2 may be a glass substrate or a plastic substrate which is substantially the same material as the first base layer BS1. On a lower surface of the second base layer BS2, the black matrix BM and the third insulation layer 40 may be sequentially disposed.

On a lower surface of the third insulation layer 40, the common electrode CE to which a common voltage Vcom is applied is disposed. The common voltage Vcom may have a different value from a pixel voltage.

The liquid crystal layer LCL may be disposed between the first display substrate DS1 and the second display substrate DS2. Although not illustrated, the first display substrate DS1 may further include a first alignment film, and the second display substrate 200 may further include a second alignment film. Through the first alignment film and the second alignment film, the liquid crystal layer LCL may be initially aligned.

Meanwhile, the cross-section of the pixel PX shown in FIG. 2B is only an example. The first display substrate DS1 and the second display substrate DS2 may switch positions with each other. In addition, the vertical alignment (VA) mode liquid crystal display panel has been described. However, an in-plane switching (IPS) mode liquid crystal display panel, a fringe-field switching (FFS) mode liquid crystal display panel, a plane to line switching (PLS) mode liquid crystal display panel, or the like may be applied to an embodiment of the inventive concept. For example, the common electrode CE included in the second display substrate DS2 may be included in the first display substrate DS1 in the case of the IPS mode or the PLS mode.

Figure 3:
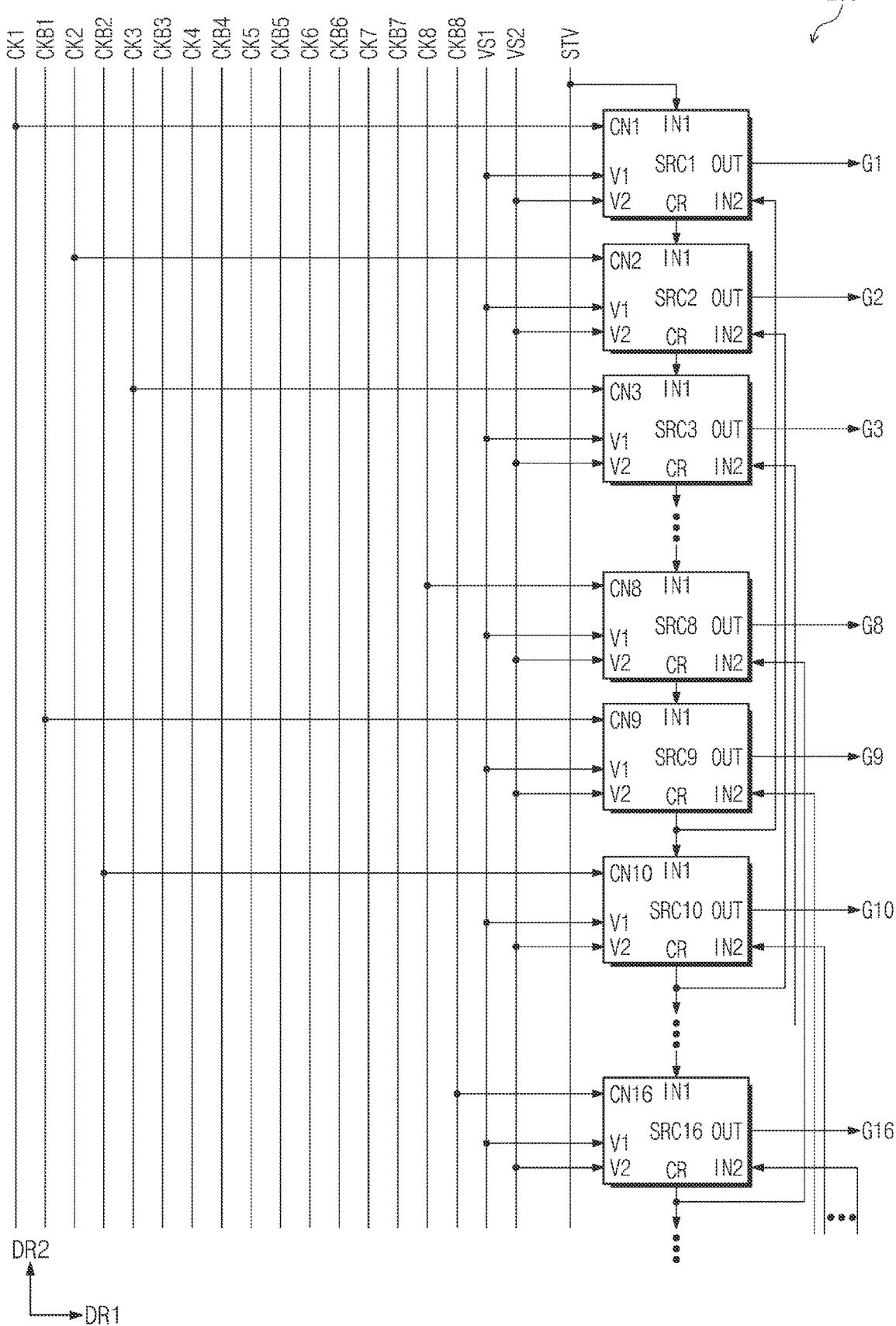
FIG. 3 is a circuit diagram of a gate driving circuit including a plurality of stages according to an embodiment of the inventive concept.

FIG. 3 is a circuit diagram of a gate driving circuit including a plurality of stages according to an embodiment of the inventive concept.

Referring to FIG. 3, the gate driving circuit 200 may include a stage part. The stage part may include a plurality of driving stages and dummy stages which are cascade-connected to each other. The plurality of driving stages may be connected to the gate lines GL1 to GLn illustrated in FIG. 2A, respectively. The plurality of driving stages may output gate signals to the gate lines GL1 to GLn, respectively.

Hereinafter, in FIG. 3, a plurality of stages SRC1 to SRC16 corresponding to the driving stages are illustrated. According to the number of the gate lines GL1 to GLn, the structure of the plurality of stages SRC1 to SRC16 may be repeatedly arranged. Meanwhile, the dummy stages which are not shown may be provided as having substantially the same structure as the driving stages.

In detail, the stages SRC1 to SRC16 may sequentially output first to sixteenth gate signals G1 to G16, respectively. For example, an n-th stage may output an n-th gate signal to an n-th gate line. Here, n is defined as a natural number. Each of the stages SRC1 to SRC16 includes a first input terminal IN1, a second input terminal IN2, a clock terminal CNj (here, j is a natural number), a first discharge terminal V1, a second discharge terminal V2, an output terminal OUT, and a carry terminal CR.

The carry terminal CR of each of the stages SRC1 to SRC16 is electrically connected to the first input terminal IN1 of the next stage. An i-th stage may output an i-th carry signal through the carry terminal CR. Here, i is defined as a natural number. The first input terminal IN1 of a first stage SRC1 receives, instead of a carry signal of the previous stage, a vertical start signal STV for starting the operation of the gate driving circuit 200 output from the signal control circuit 100. The first input terminal IN1 of each of stages SRC2 to SRC16 after the first stage SRC1 receives a carry signal of the previous stage. The first input terminal IN1 of the i-th stage is electrically connected to the carry terminal CR of an i−1-th stage. Meanwhile, this is only an example. The electrical connection between the stages are allowed as long as the first input terminal IN1 of the i-th stage is electrically connected to a carry terminal of the previous stage, for example, the i−1-th stage, an i−2-th stage, an i−3-th stage, and the like.

The second input terminal IN2 of the i-th stage is electrically connected to the carry terminal CR of an i+8-th stage and receives a carry signal of the i+8-th stage. For example, the second input terminal IN2 of the first stage SRC1 receives a carry signal of a ninth stage SRC9, and the second input terminal IN2 of a second stage SRC2 receives a carry signal of a tenth stage.

However, the embodiment of the inventive concept is not limited thereto. The second input terminal IN2 of the i-th stage may be electrically connected to the carry terminal CR of an i+k-th stage. Here, k may be a natural number.

Meanwhile, at least one driving stage among the stages may receive a carry signal through a dummy stage. That is, the second input terminal IN2 of at least one driving stage may receive a carry signal output from a dummy stage. The dummy stages are sequentially connected to the last driving stage among the driving stages. However, the position and number of dummy stages may be a design choice and may be changed according to the design intention of a person skilled in the art.

According to the inventive concept, the plurality of stages SRC1 to SRC16 may include first stage group SRC1 to SRC8 and second stage group SRC9 to SRC16. The first stage group SRC1 to SRC8 and the second stage group SRC9 to SRC16 may be cascade-connected to each other along the second direction DR2. For example, the second stage group SRC9 to SRC16 may be arranged in succession to the first stage group SRC1 to SRC8 along the second direction DR2.

Clock terminals CN1 to CN8 of the first stage group SRC1 to SRC8 may respectively receive first to eighth clock signals CK1 to CK8. Clock terminals CN9 to CN16 of the second stage group SRC9 to SRC16 may respectively receive first to eighth clock bar signals CKB1 to CKB8.

According to the inventive concept, the first stage group SRC1 to SRC8 may sequentially output first to eight gate signals G1 to G8 through the output terminal OUT in response to the first to eighth clock signals CK1 to CK8, respectively. The second stage group SRC9 to SRC16 may sequentially output ninth to sixteenth gate signals through the output terminal OUT in response to the first to eighth clock bar signals CKB1 to CKB6, respectively. The operations of the first stage group SRC1 to SRC8 and the second stage group SRC9 to SRC16 may be repeatedly performed.

One clock signal supplied to the first stage group SRC1 to SRC8 and one clock signal supplied to the second stage group SRC9 to SRC16 may have inverted phases with respect to each other. As an example, the first clock signal CK1 and the first clock bar signal CKB1 may have inverted phases with respect to each other. A clock terminal CN1 of the first stage SRC1 among the first stage group SRC1 to SRC8 may receive the first clock signal CK1 having a high voltage. In this case, a clock terminal CN9 of the ninth stage SRC9 among the second stage group SRC9 to SRC16 receives a first clock bar signal CKB1 having a low voltage which has an inverted phase with respect to the first clock signal CK1 having a high voltage. On the contrary, when the first clock signal CK1 having a low voltage is received by the clock terminal CN1 of the first stage SRC1, the first clock bar signal CKB1 having a high voltage which has an inverted phase with respect to the first clock signal CK1 having a low voltage is provided to the clock terminal CN9 of the ninth stage SRC9.

As another example, an eighth clock signal CK8 and an eighth clock bar signal CKB8 may have inverted phases with respect to each other. A clock terminal CN8 of an eight stage SRC8 among the first stage group SRC1 to SRC8 receives the eighth clock signal CK8 having a high voltage, and a clock terminal CN16 of a sixteenth stage SRC16 among the second stage group SRC9 to SRC16 receives the eighth clock bar signal CKB8 having a low voltage. On the contrary, when the eighth clock signal CK8 having a low voltage is received by the clock terminal CN8 of the eighth stage SRC8, the eighth clock bar signal CKB8 having a high voltage is provided to the clock terminal CN16 of the sixteenth stage SRC16.

In addition, a first discharge voltage VS1 may be output to the first discharge terminal V1 of each of the stages SRC1 to SRC16, and a second discharge voltage VS2 may be output to the second discharge terminal V2 of each of the stages SRC1 to SRC16. As an example, the first discharge voltage VS1 and the second discharge voltage VS2 each may be a ground voltage or a level lower than the ground voltage.

As an example, the voltage level of the first discharge voltage VS1 may be higher than the voltage level of the second discharge voltage VS2. The first discharge voltage VS1 may be set to about −10 V to −5 V, and the second discharge voltage VS2 may be set to about −16 V to −10 V. As another example, the voltage level of the first discharge voltage VS1 may have substantially the same voltage level.

Figure 4:
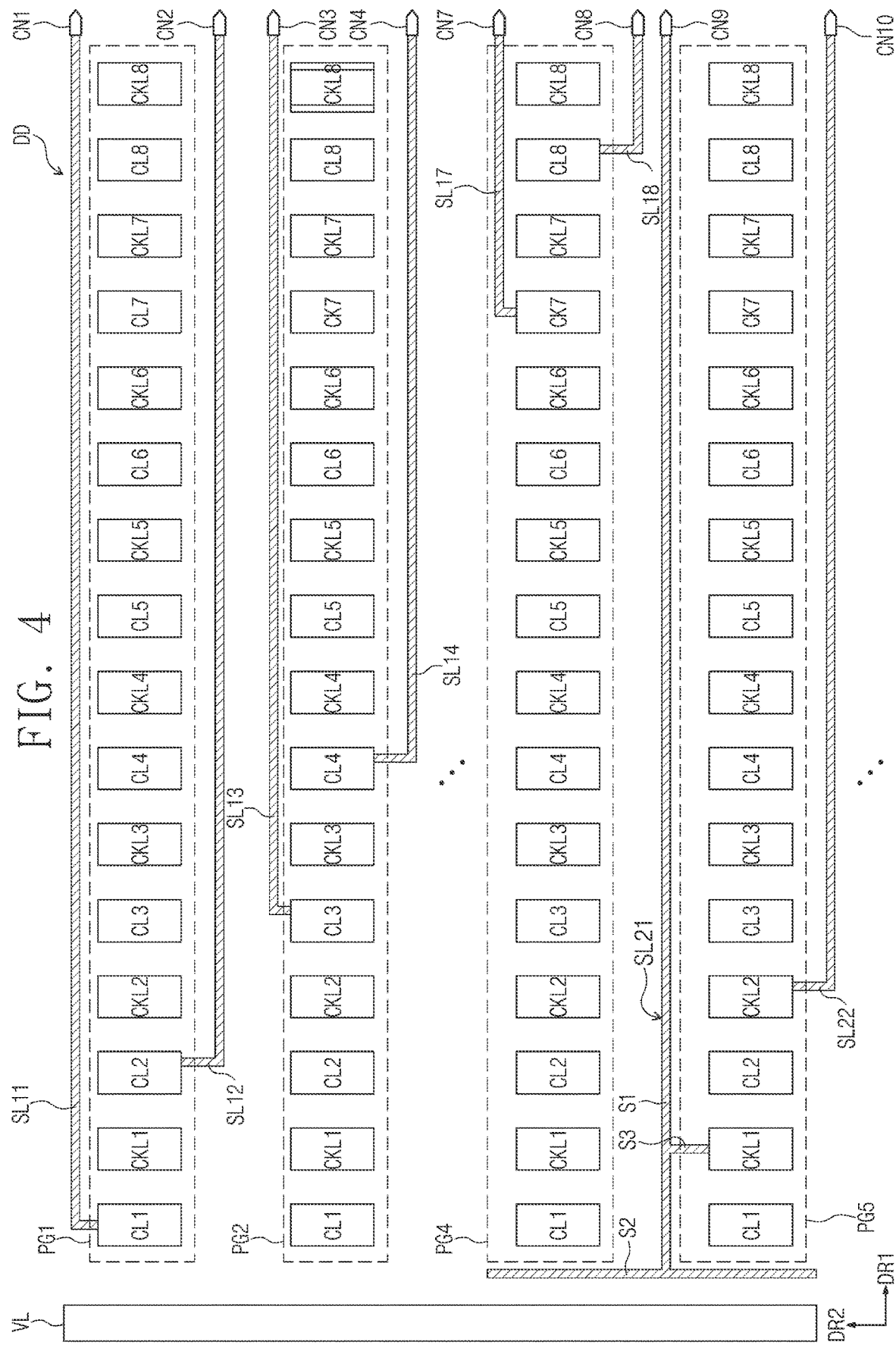
FIG. 4 is a diagram showing a line part which provides a gate control signal to the stages illustrated in FIG. 3 according to an embodiment of the inventive concept.
Figure 5:
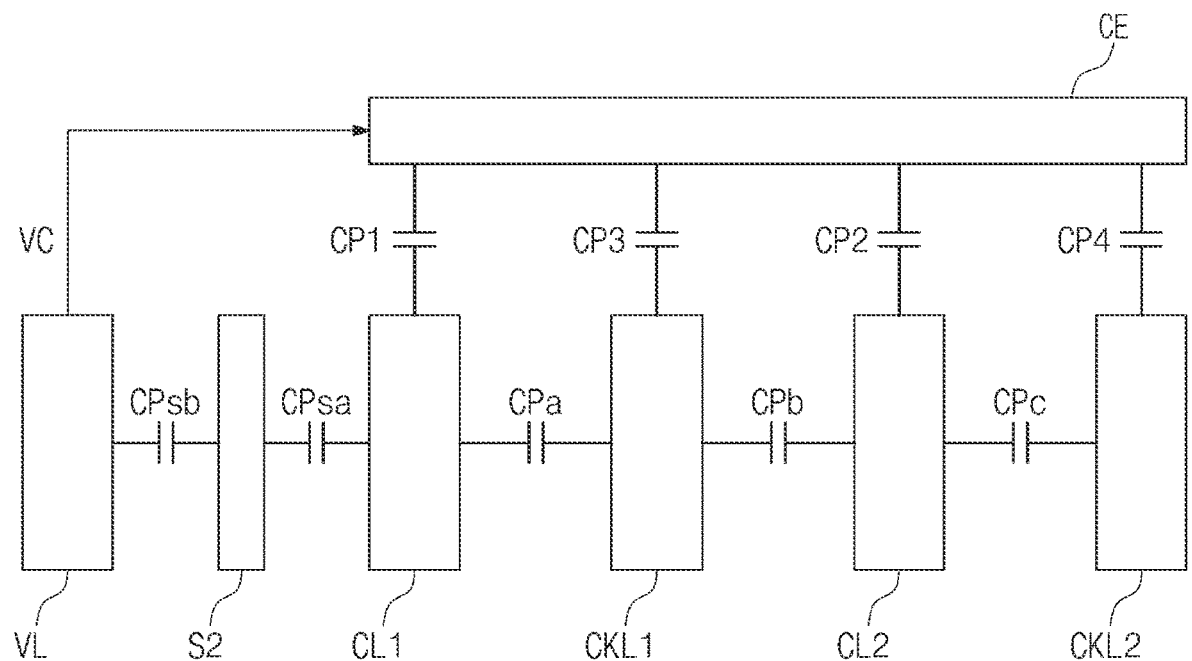
FIG. 5 is a circuit diagram showing parasitic capacitors between a common electrode and a line pattern row according to an embodiment of the present invention.
Figure 6:
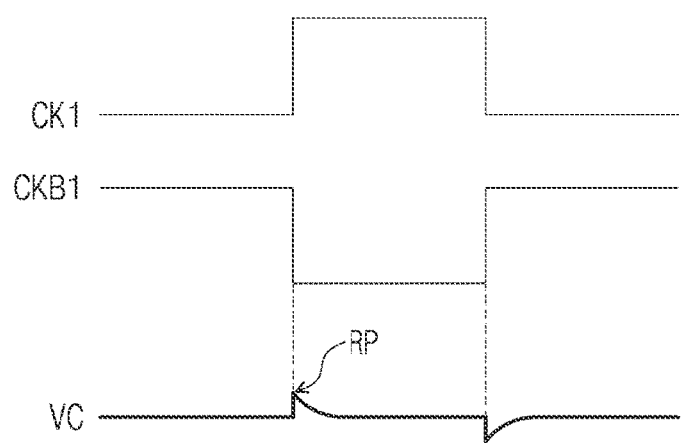
FIG. 6 is a timing diagram of a common signal according to an embodiment of the inventive concept.

FIG. 4 is a diagram showing a line part which provides a gate control signal to the stages illustrated in FIG. 3 according to an embodiment of the inventive concept. FIG. 5 is a circuit diagram showing parasitic capacitors between a common electrode and a line pattern row according to an embodiment of the present invention. FIG. 6 is a timing diagram of a common signal according to an embodiment of the inventive concept.

Referring to FIG. 4, the gate driving circuit 200 may further include a line part in addition to the stage part illustrated in FIG. 3. According to the inventive concept, the line part may include a line pattern part and a branch line part.

The line pattern part may include a plurality of line pattern rows extending in the first direction DR1 and arranged in the second direction DR2. The branch line part includes first branch lines SL11 to SL18 electrically connected to clock terminals CN of the above-described first stage group SR1 to SR8, respectively, and second branch lines SL21 to SL28 electrically connected to clock terminals CN of the second stage group SR9 to SR16, respectively. The first branch lines SL11 to SL18 and the second branch lines SL21 to SL28 extend in the first direction DR1 and may be arranged in the second direction DR2.

According to the inventive concept, the line pattern rows may include four first pattern rows connected to the first branch lines SL11 to SL18 and four second pattern rows connected to the second branch lines SL21 to SL28. Hereinafter, for convenience of description, in FIG. 4, three first pattern rows PG1, PG2, and PG4 among the first pattern rows and one second pattern row PG5 among the second pattern rows are illustrated. In addition, in FIG. 4, among the first branch lines SL11 to SL18, first branch lines SL11, SL12, SL13, SL14, SL17, and SL18 connected to the three first pattern rows PG1, PG2, and PG4 are illustrated, and among the second branch lines SL21 to SL28, second branch lines SL21 and SL22 connected to the one second pattern row PG5 are illustrated.

Each of the first pattern rows includes first to eighth clock line patterns CL1 to CL8 and first to eighth clock bar line patterns CKL1 to CKL8 spaced apart from each other and alternately arranged along the first direction DR1. For example, a first clock line pattern CL1, a first clock bar line pattern CKL1, a second clock line pattern CL2, and a second clock bar line pattern CKL2 may sequentially arranged along the first direction DR1. Particularly, in the first direction DR1, two outermost line patterns of each of the line pattern rows may be the first clock line pattern CL1 and the eight clock bar line pattern CKL8.

According to the inventive concept, two branch lines among a plurality of branch lines may be electrically connected to any one corresponding line pattern row among line pattern rows. In detail, each of the first pattern rows is electrically connected to two corresponding first branch lines among the first branch lines SL11 to SL18. The two first branch lines may be respectively and electrically connected to two clock line patterns among the first to eighth clock line patterns CL1 to CL8 included in each of the first pattern rows.

As an example, two first branch lines SL11 and SL12 among the first branch lines SL11 to SL18 may have a structure of being respectively connected to the first clock line pattern CL1 and the second clock line pattern CL2 included in the first pattern row PG1. In fact, the first clock line pattern CL1 and any one first branch line SL11 may be formed in an integral shape, and the second clock line pattern CL2 and the other first branch line SL12 may be formed in an integral shape. That is, a branch line and a clock line pattern according to the inventive concept may be formed from the same material through the same process.

As another example, two second branch lines SL21 and SL22 among the second branch lines SL21 to SL28 may be electrically connected to the first clock bar line pattern CKL1 and the second clock bar line pattern CKL2 included in the second pattern row PG5, respectively. Similarly, a branch line and a clock bar line pattern according to the inventive concept may be formed from the same material through the same process.

According to the inventive concept, the first to eighth clock line patterns CL1 to CL8 and the first to eighth clock bar line patterns CKL1 to CKL8 have the same material as the first electrode IE and the second electrode OE of the thin film transistors TR-F illustrated in FIG. 2B and may be formed in a single process.

Any one clock line pattern among the first to eighth clock line patterns CL1 to CL8 included in each of the first pattern rows may receive any one clock signal among the first to eighth clock signals CK1 to CK8 illustrated in FIG. 3. For example, the first clock signal CK1 may be received by the first clock line pattern CL1 among the first to eighth clock line patterns CL1 to CL8 included in the first pattern row PG1. The first clock signal CK1 received by the first clock line pattern CL1 may be transmitted to the clock terminal CN1 of the first stage SRC1 through a first branch line SL11.

Any one clock bar line pattern among the first to eighth clock bar line patterns CKL1 to CKL8 included in each of the second pattern rows may receive any one clock bar signal among the first to eighth clock bar signals CKB1 to CKB8 illustrated in FIG. 3. For example, the first clock bar signal CKB1 may be received by the first clock bar line pattern CKL1 among the first to eighth clock bar line patterns CKL1 to CKL8 included in the second pattern row PG5. The first clock bar signal CKB1 received by the first clock bar line pattern CKL1 may be transmitted to the clock terminal CN9 of the ninth stage SRC9 through a second branch line SL21.

The display panel DP illustrated in FIG. 2B may further include a common line VL disposed adjacent to line pattern rows of the gate driving circuit 200. In the present disclosure, the common line VL may be described as a signal line. The common line VL is electrically connected to the common electrode CE illustrated in FIG. 2B and may transmit a common signal to the common electrode CE. According to the inventive concept, the common line VL may be disposed on a different layer from the branch line, the clock line pattern, and the clock bar line pattern described with reference to FIG. 4. For example, the common line VL has the same material as the control electrode GEP of the thin film transistors TR-F illustrated in FIG. 2B and may be formed in a single process.

In detail, the common line VL extends in the second direction DR2 and may face the line pattern rows in the first direction DR1 in a plan view. Particularly, the common line VL may be most adjacent to the first clock line pattern CL1 among line patterns included in each of the line pattern rows.

Meanwhile, as the first clock line pattern CL1 is disposed adjacent to the common line VL, the capacitance of a parasitic capacitor formed between the first clock line pattern CL1 and the common line VL may be large. This may cause a ripple of a common signal VC provided to the common electrode CE.

In detail, in FIG. 5, a structure in which two clock line patterns CL1 and CL2 and two clock bar line patterns CKL1 and CKL2 are alternately arranged is illustrated. According to the inventive concept, the clock line patterns CL1 and CL2 and the clock bar line patterns CKL1 and CKL2 may be included in the first display substrate DS1 (see FIG. 2B). In this case, each of the clock line patterns CL1 and CL2 and the clock bar line patterns CKL1 and CKL2 may form a parasitic capacitor with the common electrode CE included in the second display substrate DS2 (see FIG. 2B).

For example, a first parasitic capacitor CP1 is formed between the first clock line pattern CL1 and the common electrode CE, and a second parasitic capacitor CP2 is formed between the second clock line pattern CL2 and the common electrode CE. A third parasitic capacitor CP3 is formed between the first clock bar line pattern CKL1 and the common electrode CE, and a fourth parasitic capacitor CP4 is formed between the second clock bar line pattern CKL2 and the common electrode CE.

In addition, a parasitic capacitor CPa is formed between the first clock line pattern CL1 and the first clock bar line pattern CKL1, a parasitic capacitor CPb is formed between the first clock bar line pattern CKL1 and the second clock line pattern CL2, and a parasitic capacitor CPc is formed between the second clock line pattern CL2 and the second clock bar line pattern CKL2. In fact, the parasitic capacitors CPa, CPb, and CPc may have substantially similar capacitance.

According to an embodiment of the inventive concept, any one second branch line SL21 among the second branch lines SL21 to SL28 may be disposed between the common line VL and the first clock line pattern CL1 in a plan view.

In detail, referring to FIG. 4 again, any one second branch line SL21 among the second branch lines SL21 to SL28 may be disposed between the common line VL and the first clock line pattern CL1 in a plan view. The second branch line SL21 may be connected to the first clock bar line pattern CKL1 which is disposed close to the common line VL among the first to eighth clock bar line patterns CKL1 to CKL8 included in the second pattern row PG5. Meanwhile, the first clock line pattern CL1 may be disposed between the first clock bar line pattern CKL1 and the common line VL.

Particularly, the second branch line SL21 may overlap a region disposed between the second pattern rows and the common line VL. Remaining second branch lines SL22 to SL28 among the second branch lines SL21 to SL28 may not overlap the region disposed between the line pattern rows and the common line VL.

According to an embodiment of the inventive concept, the second branch line SL21 includes a first line portion S1 extended in the first direction DR1 and a second line portion S2 extended in the second direction DR2 and disposed between the common line VL and the first clock line pattern CL1 in a plan view. In addition, the second branch line SL21 may further include a third line portion S3 disposed between the first line portion S1 and the first clock line pattern CL1. The third line portion S3 is shorter than the second line portion S2 and may extend in the second direction DR3. The second branch line SL21 may be disposed adjacent to the last first branch line SL18 among the first branch lines SL11 to SL18.

Particularly, the second line portion S2 extending in the second direction DR2 may face the first clock line pattern CL1 included in at least one first pattern row and the first clock line pattern CL1 included in at least one second pattern row.

As illustrated in FIG. 5, the second line portion S2 may be disposed between the first clock line pattern CL1 and the common line VL in a plan view. The second line portion S2 and the first clock line pattern CL1 have the same material and are formed in a single process, and the common line VL may be disposed on a different layer than the second line portion S2 and the first clock line pattern CL1.

In this case, a parasitic capacitor between the first clock line pattern CL1 and the common line VL may be partitioned into a parasitic capacitor CPsa formed between the second line portion S2 and the first clock line pattern CL1 and a parasitic capacitor CPsb formed between the second line portion S2 and the common line VL. As a result, the first parasitic capacitor CP1 formed between the first clock line pattern CL1 and the common line CE may be reduced.

According to the above, the difference in capacitance between the parasitic capacitor CP1 formed between the first clock line pattern CL1 and the common electrode CE and the parasitic capacitor CP3 formed between the first clock bar line pattern CKL1 and the common electrode CE may be reduced.

As illustrated in FIG. 6, the first clock signal CK1 applied to the first clock line pattern CL1 and the first clock bar signal CKB1 applied to the first clock bar line pattern CKL1 may have inverted phases with each other. Particularly, as described above, as the difference between the capacitance of the first parasitic capacitor CP1 and the capacitance of the second parasitic capacitor CP2 is reduced, a ripple RP of the common signal VC applied to the common electrode CE may be reduced.

In other words, as the difference between the parasitic capacitance between the first clock signal CK1 applied to the first clock line pattern CL1 and the common signal VE and the parasitic capacitance between the first clock bar signal CKB1 and the common signal VC is reduced, a ripple occurring to the common signal VC may be reduced.

FIG. 7 is a diagram showing a line part which provides a gate control signal to the stages illustrated in FIG. 3 according to another embodiment of the inventive concept.

Referring to FIG. 7, two first branch lines SL11 and SL12 may be connected to the first pattern row PG1 among the first pattern rows. The clock line pattern CL1 included in the first pattern row PG1 is connected to any one first branch line SL11, and the second clock line pattern CL2 is connected to the other first branch line SL12.

The first pattern row PG1 may face any one second pattern row PG8 among the second pattern rows in the second direction DR2. Particularly, the first branch line SL11 includes a parallel line portion SL11a extending in the first direction DR1 and a protruding line portion SL11b having a shape bent from the parallel line portion SL11a along the second direction DR2.

According to an embodiment of the inventive concept, the protruding line portion SL11b of the first branch line SL11 may be bent to have a portion disposed close to the eighth clock bar line pattern CKL8 which is farthest from the common line VL among the first to eighth line patterns CKL1 to CKL8 included in any one second pattern row. In other words, the protruding line portion SL11b of the first branch line SL11 may be disposed more adjacent to the eighth clock bar line pattern CKL8 than the parallel line portion SL11a of the first branch line SL11. As a result, the distance between the first branch line SL11 and the eight clock bar line pattern CKL8 is reduced though the protruding line portion SL11b, so that the load capacitance of the eighth clock bar line pattern CKL8 may be increased.

That is, as the protruding line portion SL11b of the first branch line SL11 has a portion disposed more adjacent to the eighth clock bar line pattern CKL8 than the parallel line portion SL11a, the load capacitance of the eighth clock bar line pattern CKL8 may be increased.

Meanwhile, in FIG. 7, a shape of the parallel line portion SL11b protruding toward the eighth clock bar line pattern CKL8 from the parallel line portion SL11a of the first branch line SL11 is illustrated. However, the shape of the parallel line portion SL11b may be variously modified.

According to an embodiment of the inventive concept, any one branch line may be disposed between a common line electrically connected to a common electrode and a clock line pattern electrically connected to a stage. Through the branch line disposed between the common line and the clock line pattern, the capacitance of a parasitic capacitor formed between the common electrode and the clock line pattern may be reduced.

As a result, the difference in capacitance between the parasitic capacitor formed between the clock line pattern and the common electrode and a parasitic capacitor formed between a clock bar line pattern and the common electrode may be reduced. Therefore, the ripple of a common signal applied to the common electrode is reduced, so that the overall driving reliability of a display device may be improved.

As described above, embodiments of the inventive concept have been disclosed in the drawings and the specification. Although specific terms have been used herein, they have been merely used for the purpose of describing the inventive concept and are not intended to limit the meaning or the scope of the inventive concept as set forth in the claims. Therefore, it will be understood by those skilled in the art that various modifications and equivalent embodiments may be made therefrom. Therefore, the true technical protection scope of the inventive concept should be determined by the technical spirit of the appended claims.

What is claimed is:

1. A display device comprising:
a display panel; and
a gate driving circuit configured to output a plurality of gate signals to the display panel, the gate driving circuit comprises:
a stage part including a first stage group which has a plurality of first stages and a second stage group which has a plurality of second stages and cascade-connected to the first stage group;
a branch line part including first branch lines electrically connected to the plurality of first stages, respectively, and second branch lines electrically connected to the second stages, respectively, the first branch lines and the second branch lines extending in a first direction and arranged in a second direction crossing the first direction;
line pattern rows including first pattern rows electrically connected to the first branch lines and second pattern rows electrically connected to the second branch lines, respectively; and
a signal line facing the line pattern rows in the first direction,
wherein any one second branch line among the second branch lines includes a first line portion extending in the first direction and a second line portion extending in the second direction and disposed between the signal line and the line pattern rows in a plan view.

2. The display device of claim 1, wherein each of the line pattern rows comprises a plurality of first clock line patterns and a plurality of second clock line patterns alternately arranged along the first direction.

3. The display device of claim 2, wherein:
each of the first pattern rows is electrically connected to two corresponding first branch lines among the first branch lines; and
each of the second pattern rows is electrically connected to two corresponding second branch lines among the second branch lines.

4. The display device of claim 3, wherein:
the two corresponding first branch lines are respectively connected to two corresponding first clock line patterns among the plurality of first clock line patterns; and
the two corresponding second branch lines are respectively connected to two corresponding second clock line patterns among the plurality of second clock line patterns.

5. The display device of claim 2, wherein a first clock line pattern among the plurality of first clock line patterns receives a clock signal, and a second clock line pattern among the plurality of second clock line patterns receives a clock bar signal having an inverted phase with respect to the clock signal.

6. The display device of claim 2, wherein the one second branch line is connected to a second clock line pattern disposed most adjacent to the signal line among the plurality of second clock line patterns.

7. The display device of claim 6, wherein any one first clock line pattern among the plurality of first clock line patterns is disposed between the second clock line pattern and the second line portion.

8. The display device of claim 7, wherein:
the first clock line pattern directly faces the signal line in the first direction and receives a clock signal; and
the second clock line pattern receives a clock bar signal having an inverted phase with respect to the clock signal.

9. The display device of claim 1, wherein the second line portion overlaps an area between the second pattern rows and the signal line.

10. The display device of claim 1, wherein the second branch line and the signal line are disposed on different layers.

11. The display device of claim 1, wherein each of remaining second branch lines other than the any one second branch line among the second branch lines does not overlap an area between the signal line and the line pattern rows in a plan view.

12. The display device of claim 1, wherein a first branch line connected to any one first pattern row among the first branch lines comprises a parallel line portion extended in the first direction and a protruding line portion having a shape bent from the parallel line portion.

13. The display device of claim 12, wherein each of the line pattern rows comprises a plurality of first clock line patterns and a plurality of second clock line patterns spaced apart from each other and alternately arranged along the first direction.

14. The display device of claim 13, wherein:
the first pattern row faces any one second pattern row among the second pattern rows in the second direction; and
the protruding line portion faces any one second clock line pattern among the plurality of second clock line patterns included in the second pattern row in the second direction.

15. The display device of claim 14, wherein the protruding line portion is more adjacent to the second clock line pattern than the parallel line portion in the second direction.

16. The display device of claim 14, wherein the second clock line pattern is disposed at an outermost periphery among the plurality of second clock line patterns and is disposed farthest from the signal line.

17. A display device comprising:
a display panel; and
a gate driving circuit configured to output a plurality of gate signals to the display panel, the gate driving circuit includes:
a stage part including a first stage group which has a plurality of first stages and a second stage group which has a plurality of second stages and cascade-connected to the first stage group;
a branch line part including first branch lines extended in a first direction, arranged in a second direction crossing the first direction, and electrically connected to the plurality of first stages, respectively, and second branch lines electrically connected to the second stages, respectively; and
line pattern rows including first pattern rows electrically connected to the first branch lines and second pattern rows electrically connected to the second branch lines, respectively,
wherein a first branch line connected to any one first pattern row among the first branch lines includes a parallel line portion extended in the first direction and a protruding line portion having a shape bent from the parallel line portion.

18. The display device of claim 17, further comprising a common line facing the line pattern rows in the first direction and receives a common signal,
wherein a second branch line among the second branch lines includes a first line portion extended in the first direction and a second line portion extended in the second direction and disposed between the common line and the line pattern rows in a plan view.

19. The display device of claim 17, wherein:
the one first pattern row faces any one second pattern row among the second pattern rows in the second direction; and
the protruding line portion is more adjacent to the second pattern row than the parallel line portion in the second direction.

20. The display device of claim 19, wherein:
each of the line pattern rows comprises a plurality of first clock line patterns and a plurality of second clock line patterns spaced apart from each other and alternately arranged along the first direction;
any one second clock line pattern among the plurality of second clock line patterns included in the second line pattern row faces the protruding line portion; and
the one second clock line pattern is disposed at an outermost periphery among the plurality of second clock line patterns.

* * * * *